(12) United States Patent
Perry et al.

(10) Patent No.: US 12,631,222 B2
(45) Date of Patent: May 19, 2026

(54) CLUTCH MECHANISM, IN PARTICULAR FOR A MOTORIZED VEHICLE

(71) Applicant: VALEO EMBRAYAGES, Amiens (FR)

(72) Inventors: Benoit Perry, Cergy Pontoise (FR); Bernard Dubois, Cergy Pontoise (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 18/835,906

(22) PCT Filed: Feb. 20, 2023

(86) PCT No.: PCT/EP2023/054160
§ 371 (c)(1),
(2) Date: Aug. 5, 2024

(87) PCT Pub. No.: WO2023/161176
PCT Pub. Date: Aug. 31, 2023

(65) Prior Publication Data
US 2025/0146541 A1 May 8, 2025

(30) Foreign Application Priority Data
Feb. 28, 2022 (FR) ..................................... 2201760

(51) Int. Cl.
*F16D 13/75* (2006.01)
*F16D 13/58* (2006.01)
*F16D 13/71* (2006.01)

(52) U.S. Cl.
CPC ......... *F16D 13/757* (2013.01); *F16D 13/585* (2013.01); *F16D 13/71* (2013.01)

(58) Field of Classification Search
CPC ........ F16D 13/585; F16D 13/70; F16D 13/71; F16D 13/757
(Continued)

(56) References Cited

U.S. PATENT DOCUMENTS 4,641,736 A * 2/1987 Forster .................. F16D 13/585
192/70.27
5,906,257 A * 5/1999 Mizukami ............. F16D 13/585
192/70.27

FOREIGN PATENT DOCUMENTS

DE 102012219068 A1 * 5/2013 ........... F16D 13/757
DE 102015200925 A1 * 7/2016 ........... F16D 13/585
(Continued)

OTHER PUBLICATIONS

International Search Report mailed on May 10, 2023 in PCT/EP2023/054160 filed on Feb. 20, 2023 (2 pages).

*Primary Examiner* — Richard M Lorence
(74) *Attorney, Agent, or Firm* — Oblon, McClelland, Maier & Neustadt, L.L.P.

(57) ABSTRACT
A clutch mechanism for a motorized vehicle includes a cover, a pressure plate coupled in rotation with the cover and movable axially relative thereto, and a diaphragm spring bearing against the cover and the pressure plate. The diaphragm spring is held in axial preload against the cover by a support washer provided with axial protuberances passing through the diaphragm spring and the cover. Each axial protuberance has an axial stop able to transmit the axial preload force to the cover. A plurality of elastic segments, distributed angularly about the axis of rotation (X) of the clutch mechanism, exert the axial preload on the diaphragm spring.

20 Claims, 8 Drawing Sheets

(58) Field of Classification Search
USPC ................................ 192/70.27, 89.23, 109 A
See application file for complete search history.

(56) References Cited

FOREIGN PATENT DOCUMENTS

| DE | 10 2016 202 300 A1 | 8/2017 | |
|----|----|----|----|
| FR | 2 456 878 A1 | 12/1980 | |
| FR | 2 548 301 A1 | 1/1985 | |
| FR | 2886997 A1 * | 12/2006 | ........... F16D 13/757 |
| WO | WO 2007/085766 A1 | 8/2007 | |

* cited by examiner

CLUTCH MECHANISM, IN PARTICULAR FOR A MOTORIZED VEHICLE

The present invention relates to a clutch mechanism notably for a motorized vehicle, for example a motor vehicle, a motorcycle or any other vehicle comprising at least a combustion engine. The motor vehicle can be a so-called industrial vehicle, the latter being for example a heavy goods vehicle, a public transport vehicle, or an agricultural vehicle.

More specifically, the invention relates to an improvement to the clutch mechanism that typically comprises a cover, a pressure plate, a diaphragm spring mounted, possibly with preload, between the cover and the pressure plate, and means for articulating this diaphragm spring relative to the cover.

In such a clutch mechanism, in the clutch-engaged position, the diaphragm spring exerts on the pressure plate forces that are strong enough to clamp a clutch disk between the pressure plate and a flywheel, for example a dual mass flywheel, and thus allow the transmission of engine torque to the gearbox. In the case of a clutch mechanism of the push-operated type, clutch disengagement is achieved by pressing a clutch-release thrust bearing against the central part of the diaphragm along the axis of rotation. This diaphragm spring then collaborates with the articulation means, formed between the diaphragm spring and the cover, so that the radially outer part of the diaphragm can move away from the pressure plate. Under such conditions, the pressure plate moves away from the clutch disk under the effect of elastic return means, thus releasing the disk, so that the transmission of torque from the engine to the gearbox can cease, and necessary gearshifts can be made, if applicable.

After a great many clutch-release operations, it is found that the articulation of the diaphragm spring with respect to the cover has a tendency to become worn (the terms wear and/or burring are used) under the effect of the repetitive movements, and functional play appears between this articulation and the diaphragm spring. These burring and/or wear phenomena are observed particularly in clutch mechanisms used in vehicles of the industrial vehicle or heavy duty vehicle type where the forces exerted by the diaphragm spring on the articulation may reach 10,000 N. The appearance of such a functional play has the effect of reducing the travel of the periphery of the diaphragm when this diaphragm is pushed by the clutch thrust bearing, and therefore of reducing the axial movement of the pressure plate in the transition from the clutch-engaged position to the clutch-disengaged position. In a downgraded mode, it is then no longer possible to achieve full clutch disengagement. Some of the torque from the engine thus continues to be transmitted to this disk, making gearshifts in the gearbox difficult, or even impossible. There is a need to propose a clutch mechanism in which the axial movement of the pressure plate does not vary over the course of the life of the vehicle.

Document FR 2 886 997 describes a known clutch mechanism comprising means for compensating for the functional play between the articulation and the diaphragm spring. These play-compensating means comprise a ring that is fixed with respect to the cover, a counter-ring which is mounted freely between said ring and said diaphragm, said ring and counter-ring being provided with the ramps and counter-ramps respectively. Elastic return means tend to cause said counter-ring to pivot with respect to said ring as soon as wear appears in the articulation. In this way, the counter-ring remains pressed against the diaphragm whatever the wear inflicted by this diaphragm on this counter-ring, and enables the clutch mechanism to be fully disengaged. This clutch mechanism does, however, have a complex architecture and employ a great many components that have to be moved about the axis of rotation in order to avoid a functional clearance appearing between the articulation and the diaphragm spring.

The invention seeks to overcome these technical problems by proposing an improved clutch mechanism capable of compensating for the wearing of the articulation of the diaphragm spring in such a way as to perform full disengagement of the clutch mechanism while at the same time having an architecture that is simplified with respect to the clutch mechanisms known from the prior art.

Another aim of the invention is to provide a simple, effective and economical solution to these problems.

To this end, the present invention proposes a clutch mechanism for a motorized vehicle, comprising a cover, a pressure plate coupled in rotation with the cover and movable axially relative thereto, and a diaphragm spring bearing against the cover and the pressure plate, the diaphragm spring being held in axial preload against the cover by a support washer provided with axial protuberances passing through the diaphragm spring and the cover, each axial protuberance having an axial stop able to transmit the axial preload force to the cover, and a plurality of elastic segments, distributed angularly about the axis of rotation X of the clutch mechanism, these segments being arranged between two adjacent components of the clutch mechanism, namely between the axial stop of the axial protuberances and the cover or between the support washer and the diaphragm spring, which elastic segments exert the axial preload on the diaphragm spring.

The clutch mechanism according to the invention is notable in that each elastic segment exerts a first action force over a first force-application diameter and a second action force over a second force-application diameter on one of the adjacent components of the clutch mechanism, as well as a reaction force over a third force-application diameter on the other adjacent component of the clutch mechanism, the first, second and third force-application diameters being concentric and radially spaced.

This clutch mechanism according to the invention offers the advantage of compensating for the wearing of the articulation of the diaphragm spring as a result of the elasticity of the segments on the axis of rotation X. In this way, it will always be possible to achieve full disengagement of the clutch mechanism throughout the life of the motorized vehicle. Thanks to the particular geometry of the elastic segments, the wear-compensation capability is improved by the radial offsetting of the force-application diameters. The offsetting of the force-application diameters has the effect of reducing the stiffness of the elastic segments while at the same time making it possible to tolerate the forces exerted by the diaphragm spring on the articulation that may reach as high as 10,000 N for example. For example, the action forces and the reaction force may be oriented axially.

As a preference, each elastic segment may extend angularly about the axis X over an angle comprised between 25° and 170°.

Advantageously, the number of elastic segments may be comprised between 2 and 12, the elastic segments being evenly angularly distributed about the axis X.

As a preference, at least one of the first and second action forces may be oriented axially in an opposite direction to the reaction force.

Advantageously, each elastic segment may comprise through-holes for the axial protuberances, the through-holes being arranged radially beyond the first force-application diameter for the first action force. In this way, the architecture of the articulation within the clutch mechanism is radially compact.

As a preference, the cover may support the diaphragm spring via pressed features formed directly in the cover or via an annular strip set into a groove of the cover.

Advantageously, each elastic segment may comprise a first application surface for the first action force, a second application surface for the second action force, a third application surface for the reaction force, the third application surface being offset axially with respect to the first and second application surfaces.

As a preference, the force-application diameter for at least one of the first and second action forces or the reaction force may be offset radially with respect to the implantation diameter at which the axial protuberances are implanted.

According to one embodiment of the invention, the third force-application diameter for the reaction force may be arranged radially beyond the first and second force-application diameters. Offsetting the third force-application diameter for the reaction force has the effect of reducing the stiffness of the elastic segments and of increasing the capability to compensate for the wearing of the articulation of the diaphragm spring.

Advantageously, the first action force over a first force-application diameter and the second action force over a second force-application diameter may be oriented axially in opposite directions.

As a preference, each elastic segment, arranged between the support washer and the diaphragm spring, may comprise a pressing diameter for pressing on the diaphragm spring that coincides with the third force-application diameter.

Advantageously, each elastic segment may comprise tabs originating from an internal circumferential edge, and the support washer may comprise orifices distributed angularly about the axis X, the tabs of the elastic segments being inserted in the orifices.

As a preference, the support washer may comprise an upper pressure face oriented toward the diaphragm spring and a lower pressure face, axially opposite to the upper pressure face, each elastic segment pressing simultaneously on the lower pressure face with the first action force, and on the upper pressure face with the second action force.

Advantageously, the tabs of each elastic segment may press on the lower pressure face of the support washer.

Advantageously, each elastic segment may press on an internal periphery of the support washer via each tab which is formed at an angle A with respect to the lower pressing pressure face of the support washer.

As a preference, the second force-application diameter for the second action force may be substantially coincident with the implantation diameter at which the axial protrusions originating out of the support washer are implanted.

Advantageously, the support washer may comprise at least one centering stud associated with each elastic segment, each of the centering studs being inserted into a hole formed in the associated elastic segment. The centering stud may be extruded from the annular part of the support washer.

As a variant, each elastic segment may comprise tabs originating from an internal circumferential edge, and the support washer may comprise cutouts formed on an internal edge and distributed angularly about the axis X, the tabs of the elastic segments being inserted in the cutouts.

According to another embodiment of the invention, the third force-application diameter for the reaction force may be arranged radially between the first and second force-application diameters. Offsetting the third force-application diameter for the reaction force has the effect of reducing the stiffness of the elastic segments and of increasing the capability to compensate for the wearing of the articulation of the diaphragm spring.

As a preference, the through-holes for the axial protuberances may be arranged radially between the first force-application diameter and the second force-application diameter.

Advantageously, the first action force over a first force-application diameter and the second action force over a second force-application diameter may be oriented axially in the same direction.

As a preference, the support washer may comprise an upper pressure face oriented toward the diaphragm spring, each elastic segment pressing simultaneously on the upper pressure face with the first and second action forces Advantageously, each elastic segment, arranged between the axial stop of the axial protuberances and the cover, may comprise a pressing diameter for pressing on the axial stops that coincides with the third force-application diameter.

As a preference, the cover may comprise an upper pressure face oriented axially toward the outside of the clutch mechanism, each elastic segment pressing simultaneously on the upper pressure face with the first and second action forces.

Advantageously, the diaphragm spring may be mounted in such a way as to be able to tilt with respect to the cover about articulation means. For example, the articulation means are produced in part in the form of pressed features formed directly in the cover or partly in the form of an annulus added to the cover.

The invention may have one or another of the features described below combined with one another or taken independently of one another:

each elastic segment may be fixed solidly to the support washer or to the cover using at least one fixing point, for example using riveting, welding or screw fastening;
  the fixing points for the elastic segments may be angularly distributed over the first force-application diameter;
  the fixing points may be rivets;
  the fixing points may be spot welds;
  the axial protuberances may be added to the support washer;
  the axial protuberances may be spacers crimped onto the support washer;
  the second force-application diameter for the second action force may be substantially coincident with the implantation diameter at which the spacers crimped to the support washer are implanted;
  the support washer may press directly on the diaphragm spring;
  the support washer may press indirectly on the diaphragm spring notably via the elastic segments interposed axially between the two adjacent components;
  the axial protuberances may originate from the support washer, being made as one therewith;
  the axial protuberances may be bent tabs originating out of the internal periphery of the support washer;
  the axial protuberances may pass through openings formed on an end wall of the cover;
  the tabs of the elastic segments may be offset angularly with respect to the through-holes formed to allow the axial protuberances to pass;

the tabs of the elastic segments may be oriented angularly facing the through-holes formed to allow the axial protuberances to pass.

The invention also relates, according to another of its aspects, to a transmission subassembly for a motorized vehicle, comprising:

a flywheel, a clutch mechanism including all or some of the features mentioned above, fixed to the flywheel, and a clutch disk interposed axially between the flywheel and the pressure plate of the clutch mechanism.

This transmission subassembly according to this other aspect of the invention offers the advantage of being able to transmit high torque from the combustion engine to the gearbox.

The invention will be more clearly understood on reading the following description, provided purely by way of example and with reference to the appended drawings in which.

Figure 1:
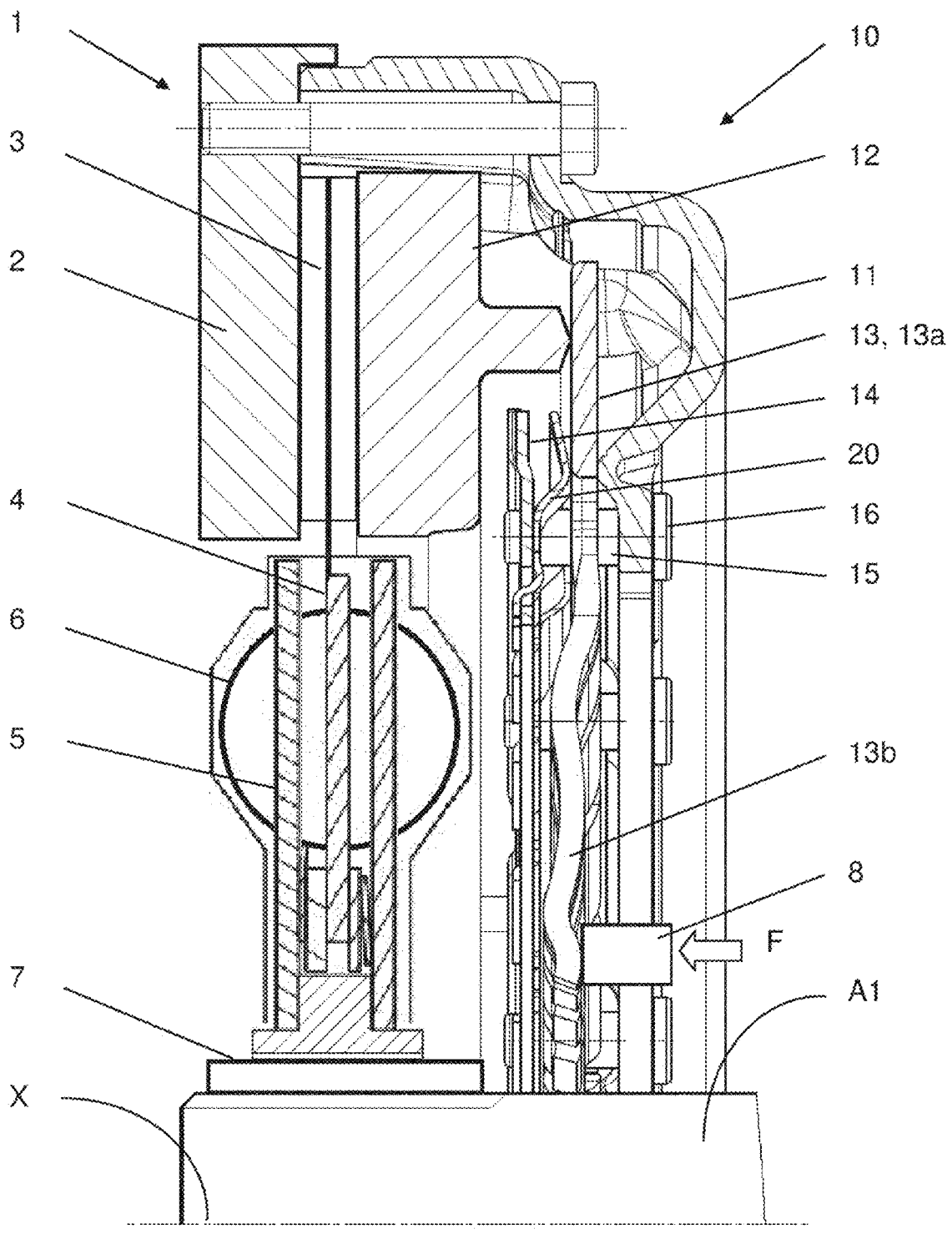
FIG. 1 is a view in axial section of a transmission subassembly for a motorized vehicle incorporating a clutch mechanism according to a first embodiment of the invention.

Hereinafter in the description and the claims, by way of non-limiting example and in order to facilitate understanding thereof, the terms "front" or "rear" will be used according to the direction relative to an axial orientation determined by the main axis of rotation X of the transmission of the motorized vehicle, and the terms "inner/internal" or "outer/external" will be used relative to the axis X and according to a radial orientation which is orthogonal to said axial orientation.

FIGS. 1 to 4 illustrate a transmission of a motorized vehicle of the industrial vehicle type incorporating the clutch mechanism 10 according to a first embodiment of the invention.

The industrial vehicle notably comprises a combustion engine, a gearbox, and a transmission subassembly 1 interposed between the combustion engine and the gearbox. The transmission subassembly 1 is kinematically connected to the driven shaft A1 of the gearbox.

The transmission subassembly 1 comprises:

a flywheel 2 rotationally connected to the output shaft of the combustion engine, a clutch mechanism 10 fixed to the flywheel, and a clutch disk 3 interposed axially between the flywheel and a pressure plate 12 of the clutch mechanism.

The clutch disk 3 comprises a torque transmission plate 4 having an annular shape about an axis of rotation X, guide elements 5 and helical compression springs 6. The two guide elements 5, also known as guide washers, are disposed one on each side of the torque transmission plate 4 trapping the helical compression springs 6 in interposed housings. This architecture of clutch disk 3 is said to be "symmetrical" because the engine torque enters first of all via the friction linings fixed to the torque transmission plate 4 and the engine torque is then transmitted to the driven shaft A1 via a hub 7 that rotates as one with the two guide elements 5.

As illustrated in FIG. 1, the clutch mechanism 10 comprises a cover 11 connected by suitable fixing means to the flywheel 2. Arranged between the cover 11 and the flywheel 2 are a diaphragm spring 13, the pressure plate 12 and the clutch disk 3. Optionally, a device that compensates for the wearing of the friction linings of the clutch disk may be positioned between the diaphragm spring and the pressure plate. The diaphragm spring 13 is arranged axially between the cover 11 and the pressure plate 12. This diaphragm spring 13 comprises, on the one hand, a peripheral part 13a and, on the other hand, fingers 13b which extend from the peripheral part 13a radially towards the inside of the diaphragm 13.

The diaphragm spring 13 is mounted in such a way as to be able to tilt relative to the cover 11 about articulation means produced here in part in the form of pressed features 18 formed directly in the cover. In a clutch-release phase, the diaphragm spring 13 is actuated by a clutch bearing 8. The clutch bearing 8 applies an axial thrust force F (see FIG. 1) to the free ends of the fingers 13b of the diaphragm spring 13. In so doing, the peripheral part 13a of the diaphragm spring 13 comes to press against the articulation means and in this way there is obtained a lever effect whereby the exterior edge of the diaphragm moves closer to the cover 11. The pressure plate 12 then moves away from the friction linings, and the transmission of torque is interrupted, so that a gearshift may be made.

With a conventional clutch mechanism, the wearing of the articulation means such as the pressed features of the cover and the zones of contact of the diaphragm spring would manifest itself in the appearance of functional play between the cover and the diaphragm spring.

The key objective of the invention is therefore to provide an improved clutch mechanism 10 capable of compensating for the wearing of the articulation of the diaphragm spring so as to achieve full disengagement of the clutch mechanism throughout the life of the motorized vehicle.

The arrangement of the clutch mechanism 10, according to one of the preferred embodiments of the invention, will now be described in more detail with reference to FIGS. 1 to 4.

Within the clutch mechanism 10, the diaphragm spring 13 is held in axial preload against the cover 11 by a support washer 14 provided with axial protuberances 15 passing through the diaphragm spring and the cover, and a plurality of elastic segments 20, distributed angularly about the axis of rotation X of the clutch mechanism, these segments being arranged between two adjacent components of the clutch mechanism, namely the support washer 14 and the diaphragm spring 13. The support washer 14 therefore presses indirectly on the diaphragm spring notably via the elastic segments interposed axially between the two adjacent components, which elastic segments 20 exert the axial preload on the diaphragm spring.

Figure 2:
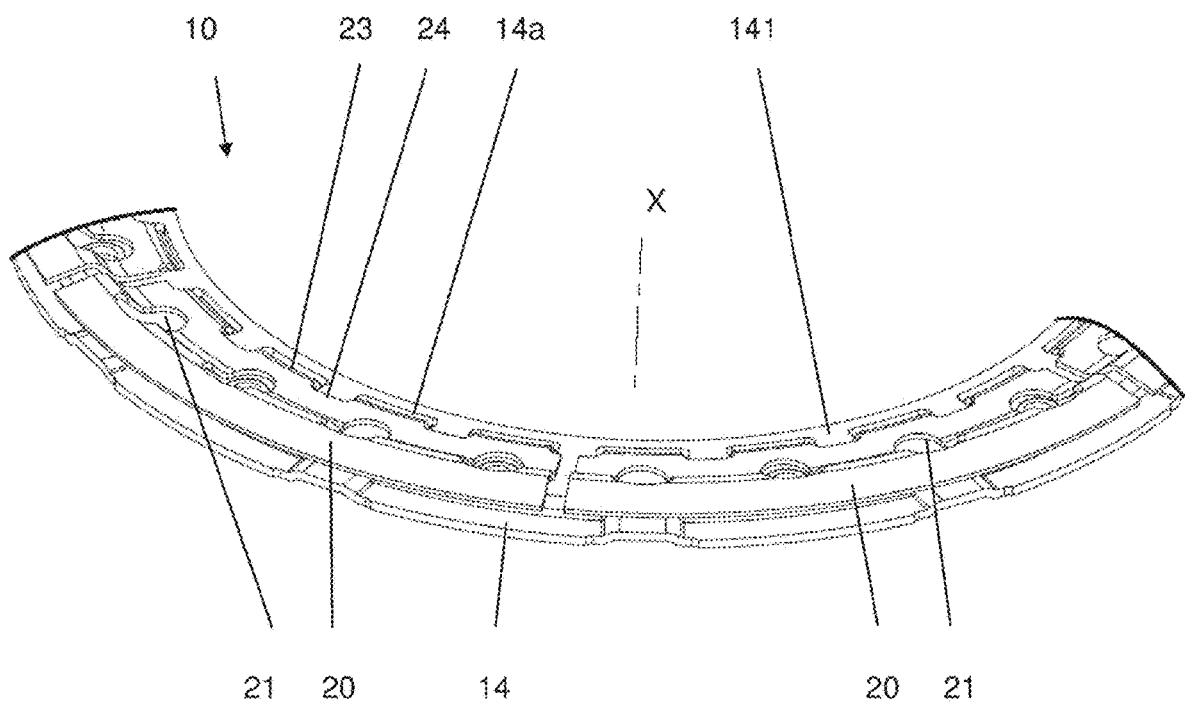
FIG. 2 is an isometric view of the elastic segments of the clutch mechanism according to the first embodiment of the invention in FIG. 1.

Each elastic segment 20 extends angularly about the axis X over an angle comprised between 25° and 170°, and the number of elastic segments may be comprised between 2 and 12, the elastic segments being evenly angularly distributed about the axis X. As illustrated in FIG. 2, the clutch mechanism by way of example comprises six elastic segments 20, which each extend angularly about the axis X by an angle of around 55°.

In order to improve these elastic properties, the elastic segment 20 is preferably made from a chromium-vanadium steel (for example a steel of the 50CV4 type) or from a high-carbon steel with a carbon content of between 0.55% and 0.95%.

Figure 4:
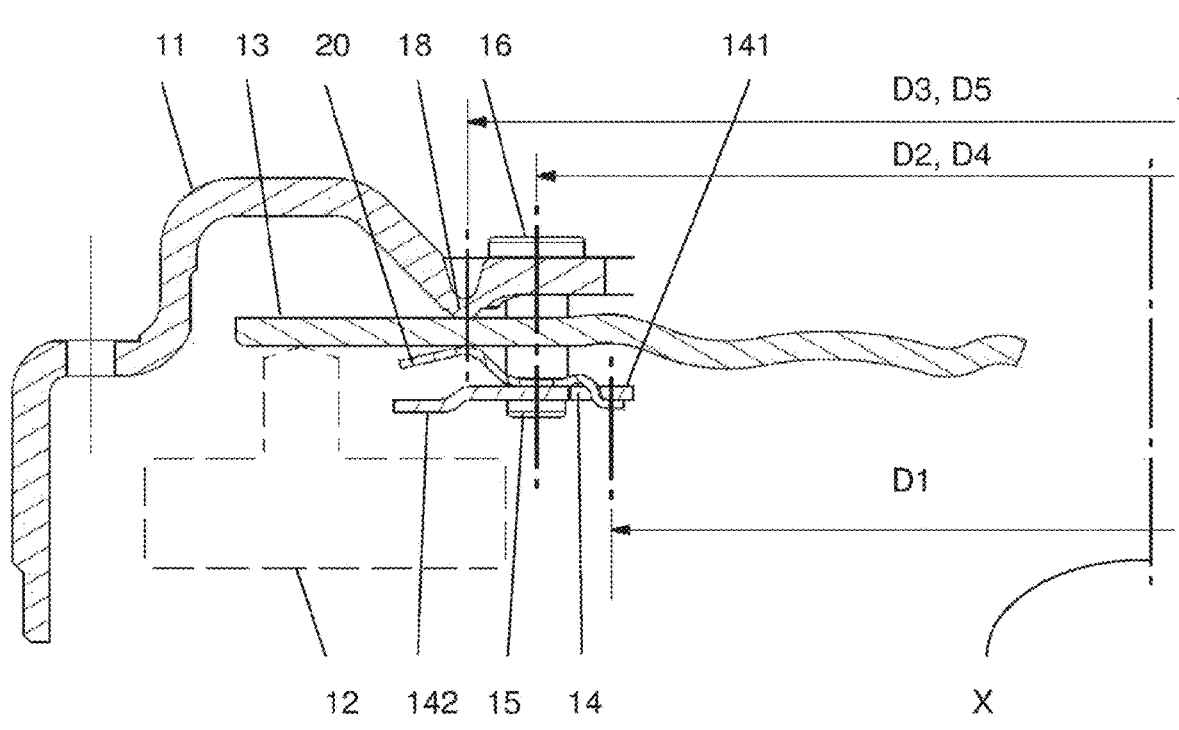
FIG. 4 is a view in axial section of the clutch mechanism according to the first embodiment of the invention in FIG. 1.

Also, each elastic segment 20 exerts a first action force over a first force-application diameter D1 and a second action force over a second force-application diameter D2 on one of the adjacent components of the clutch mechanism, in this example the support washer 14, as well as a reaction force over a third force-application diameter D3 on the other adjacent component of the clutch mechanism, in this example the diaphragm spring 13. As illustrated in FIG. 4, the first, second and third force-application diameters D1, D2 and D3 are concentric and radially spaced. Offsetting the force-application diameters has the effect of reducing the stiffness of the elastic segments. What is meant by action force and reaction force are the preload forces that each elastic segment exerts on the adjacent components when the clutch mechanism is assembled. These forces can be measured in newtons. For example, the action forces F1, F2 and the reaction force F3 are oriented axially.

In this example, each elastic segment 20, arranged between the support washer and the diaphragm spring, comprises a pressing diameter D5, for pressing on the diaphragm spring 13, that coincides with the third force-application diameter D3. The third force-application diameter D3 for the reaction force is arranged radially beyond the first and second force-application diameters D1, D2. Offsetting the third force-application diameter for the reaction force has the effect of reducing the stiffness of the elastic segments and of increasing the capability to compensate for the wearing of the articulation of the diaphragm spring. In order to keep the diaphragm spring in axial preload against the cover 11, the reaction force over the third force-application diameter D3 needs to be greater than the axial thrust force F exerted by the clutch bearing 8.

Figure 3:
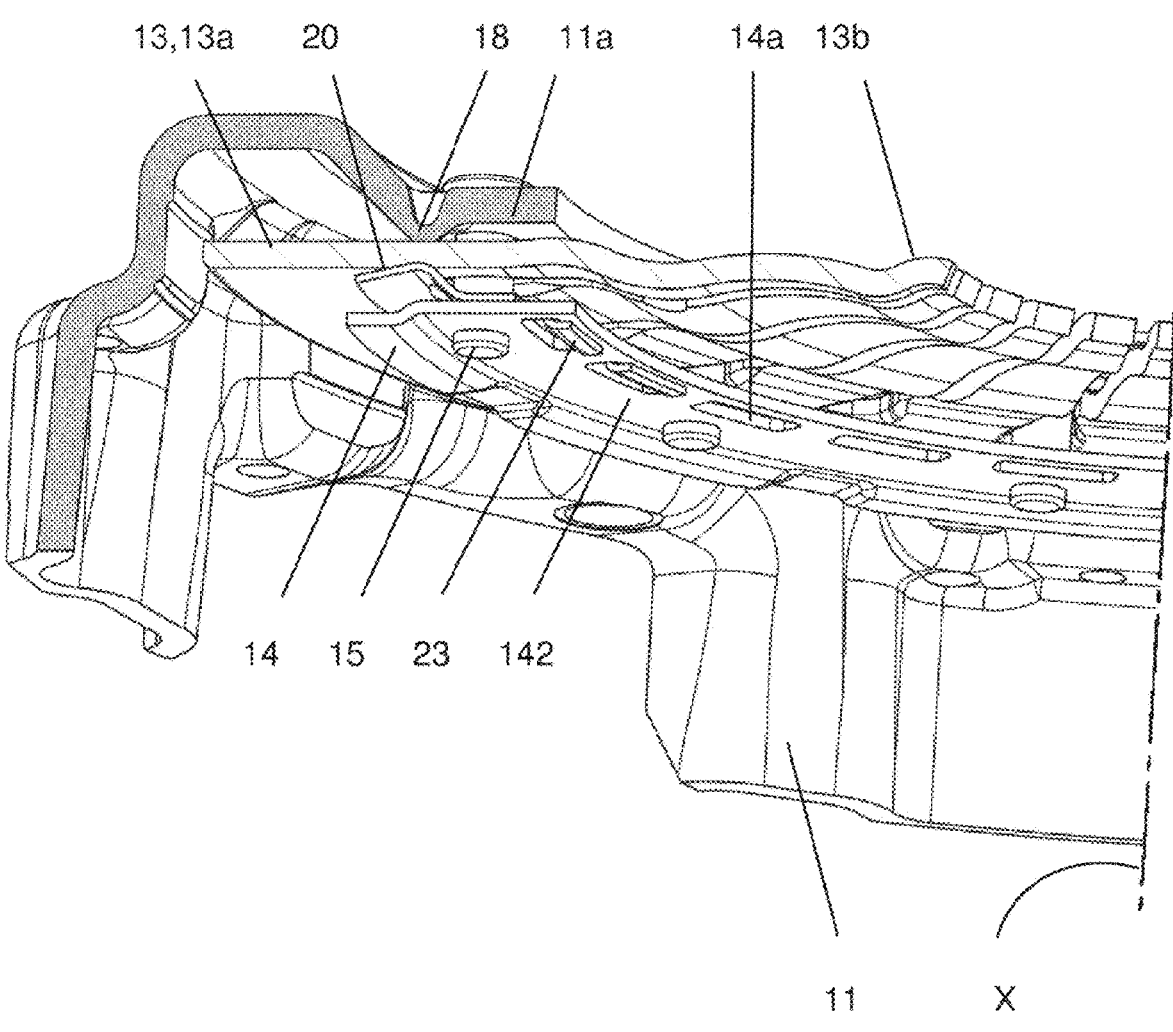
FIG. 3 is another partial isometric view of the clutch mechanism according to the first embodiment of the invention in FIG. 1.

FIG. 3 depicts the clutch mechanism 10 in a substantially as-new state. The operation of this clutch mechanism 10 according to the invention, notably during the clutch-disengagement and clutch-engagement phases, is similar to the operation of a conventional clutch mechanism except for the fact that, here, each elastic segment 20 deforms elastically during the course of these various phases in such a way that the elastic segments 20 are always in contact both with the diaphragm spring 13 and with the support washer 14. Thus, advantageously, permanent contact of the articulation means with the diaphragm spring 13 and with the cover 11 is ensured.

In this example, the first action force over a first force-application diameter D1 and the second action force over a second force-application diameter D2 are oriented axially in opposite directions. Also, the second action force is oriented axially in an opposite direction to the reaction force.

The support washer 14 is produced in the form of a rigid annular component fixed to the cover 11 via the axial protuberances 15, each axial protuberance 15 having an axial stop 16 able to transmit the axial preload force to the cover. More specifically, the axial protuberances 15 are spacers crimped onto the support washer. The axial stop 16 corresponds to an enlarged head of a spacer which rests on an upper pressure face of the cover. The second force-application diameter D2 for the second action force here is substantially coincident with the implantation diameter D4 at which the spacers crimped to the support washer 14 are implanted.

Each elastic segment 20 comprises through-holes 21 for the axial protuberances 15, the through-holes 21 being arranged radially beyond the first force-application diameter D1 for the first action force.

Finally, each elastic segment 20 comprises tabs 23 originating from an internal circumferential edge 24, and the support washer 14 comprises orifices 14a distributed angularly about the axis X, the tabs 23 of the elastic segments being inserted in the orifices 14a. The tabs 23 are oriented angularly facing the through-holes 21 formed to allow the axial protuberances 15 to pass.

As illustrated in FIG. 4, the support washer 14 comprises an upper pressure face 141 oriented toward the diaphragm spring 13 and a lower pressure face 142, axially opposite to the upper pressure face 141, each elastic segment 20 pressing simultaneously on the lower pressure face 142 with the first action force, and on the upper pressure face 141 with the second action force. In this example, the tabs 23 of each elastic segment press on the lower pressure face 142 of the support washer 14.

Figure 5:
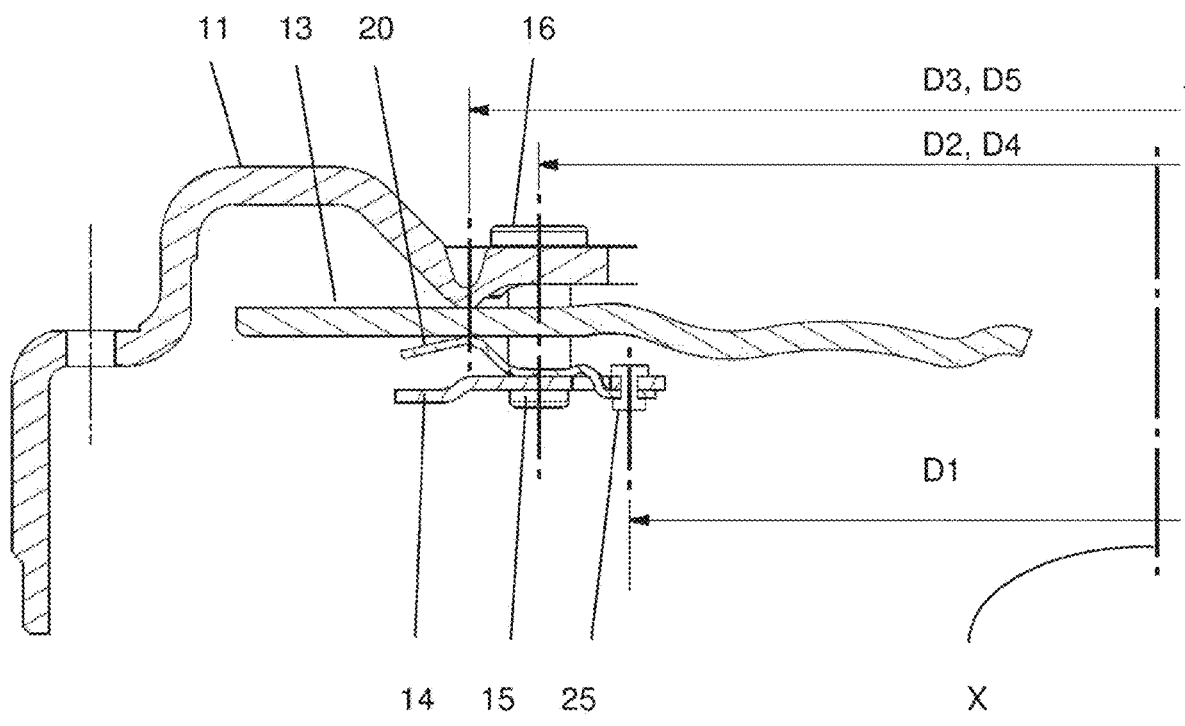
FIG. 5 is a view in axial section of a clutch mechanism according to a second embodiment of the invention.

A clutch mechanism 10 according to a second embodiment of the invention, substantially similar to the preceding one, will now be described with reference to FIG. 5. This second embodiment of the invention is distinguishable by the fact that each elastic segment 20 is fixed solidly to the support washer 14 using at least one fixing point 25, for example using riveting, welding or screw fastening.

In this example, each elastic segment 20 comprises tabs 23 originating from an internal circumferential edge 24, and the support washer 14 comprises orifices 14a distributed angularly about the axis X, the tabs 23 of the elastic segments being inserted in the orifices 14a. The fixing points 25 are arranged on the tabs 23.

The fixing points 25 for the elastic segments 20 are angularly distributed over the first force-application diameter D1. The fixing points 25 are rivets. As a variant, the fixing points may be spot welds.

Figure 6:
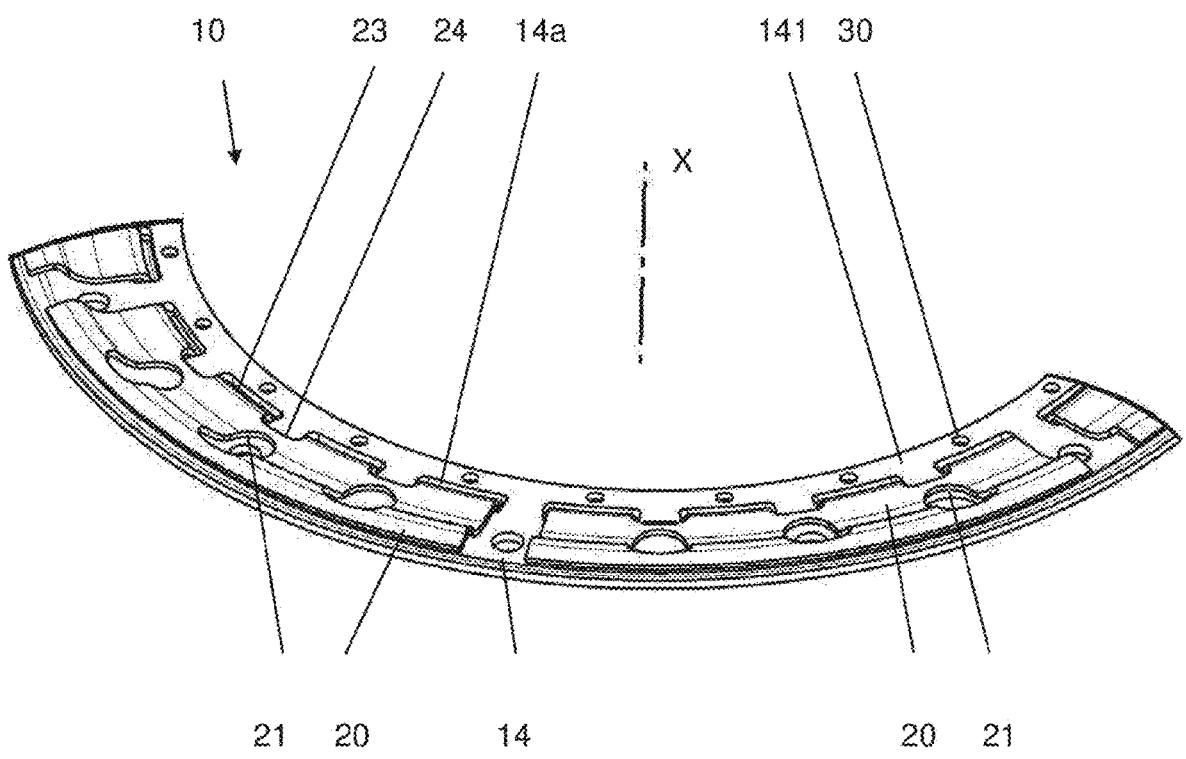
FIG. 6 is a face-on view of a clutch mechanism according to a third embodiment of the invention.

A clutch mechanism 10 according to a third embodiment of the invention, substantially similar to the first embodiment, will now be described with reference to FIGS. 6 and 7. This third embodiment of the invention is distinguishable by the fact that the support washer 14 comprises centering studs 30 associated with each elastic segment 20.

Each of the centering studs 30 is inserted in a hole 26 formed in the associated elastic segment 20 so as to hold the elastic segments in position. For example, the centering studs 30 are extruded from the annular part of the support washer 14.

In this example, each elastic segment 20 comprises tabs 23 originating from an internal circumferential edge 24, and the support washer 14 comprises orifices 14a distributed angularly about the axis X, the tabs 23 of the elastic segments being inserted in the orifices 14a. The tabs 23 are angularly offset with respect to the through-holes 21 formed to allow the axial protuberances 15 to pass.

Each elastic segment 20, arranged between the support washer and the diaphragm spring, comprises a pressing diameter D5, for pressing on the diaphragm spring 13, that coincides with the third force-application diameter D3. The third force-application diameter D3 for the reaction force F3 is arranged radially beyond the first and second force-application diameters D1, D2 for the first and second action forces F1, F2. The first force-application diameter D1 for the first action force F1 is offset radially toward the axis X in order to reduce the stiffness of the elastic segments and increase the capability to compensate for the wearing of the articulation of the diaphragm spring. In order to do that, each elastic segment 20 presses on an internal periphery of the support washer 14 via each tab 23 which is formed at an angle A with respect to the lower pressure face 142 of the support washer.

Each elastic segment 20 comprises a first application surface 201 for the first action force F1, a second application surface 202 for the second action force F2, a third application surface 203 for the reaction force F3, the third application surface 203 being offset axially with respect to the first and second application surfaces 201, 202.

The second force-application diameter D2 for the second action force F2 is substantially coincident with the implantation diameter at which the spacers 15 crimped to the support washer are implanted. According to the invention, the expression "substantially coincident" means to say that the diameters are equal or of very similar dimensions.

In this example, the first action force F1 over the first force-application diameter D1 and the second action force F2 over the second force-application diameter D2 are oriented axially in opposite directions. Also, the second action force F2 is oriented axially in an opposite direction to the reaction force F3.

Figure 7:
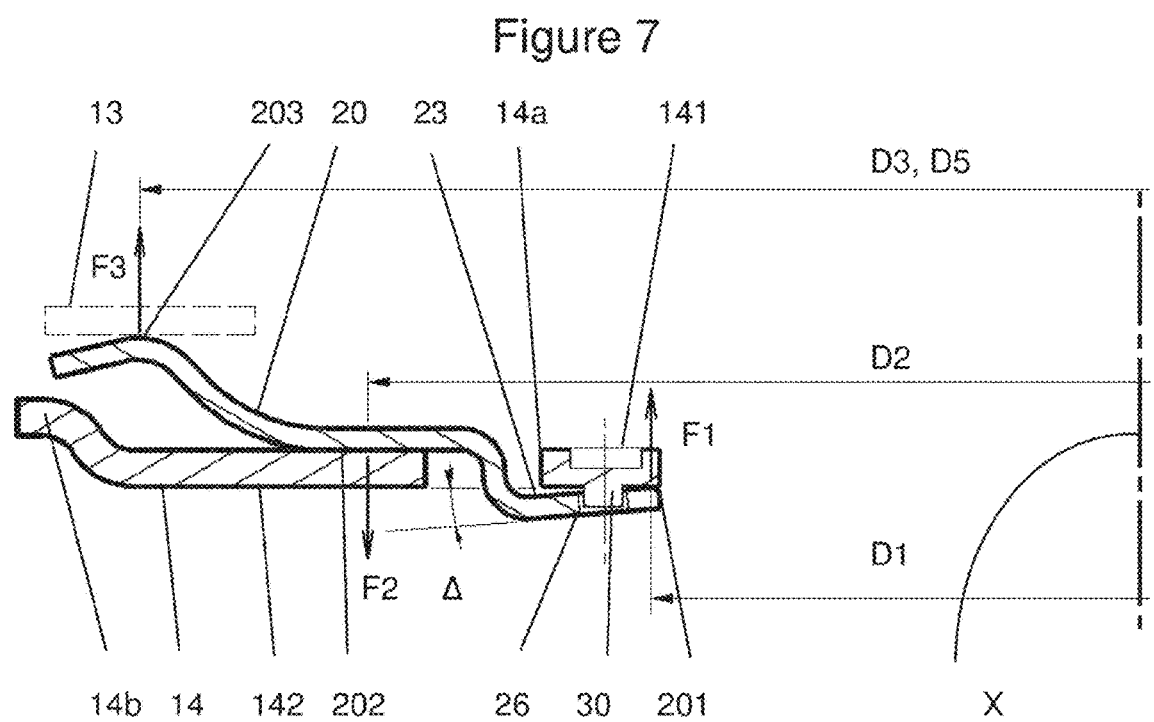
FIG. 7 is a view in axial section of the clutch mechanism according to the third embodiment of the invention in FIG. 6.

From FIG. 7 it will be appreciated that, in order to keep the diaphragm spring 13 in axial preload against the cover 11, the reaction force F3 over the third force-application diameter D3 needs to be greater than the axial thrust force F exerted by the clutch bearing 8. Each elastic segment 20 is deformed elastically in order to ensure permanent contact of the articulation means with the diaphragm spring 13 and with the cover 11. In order to prevent excessive deformation of the elastic segments 20, the support washer 14 comprises, on its external periphery, an annular pressing rim 14b which limits the axial deformation of said elastic segments. When the clutch mechanism 10 is in the clutch-engaged position, there is an axial space between this rim 14b and the external radial end of each elastic segment. Beyond a certain force, the external radial end is able to come to press against the annular pressing rim 14b and thus prevent the elastic segments from cracking or breaking.

Figure 8:
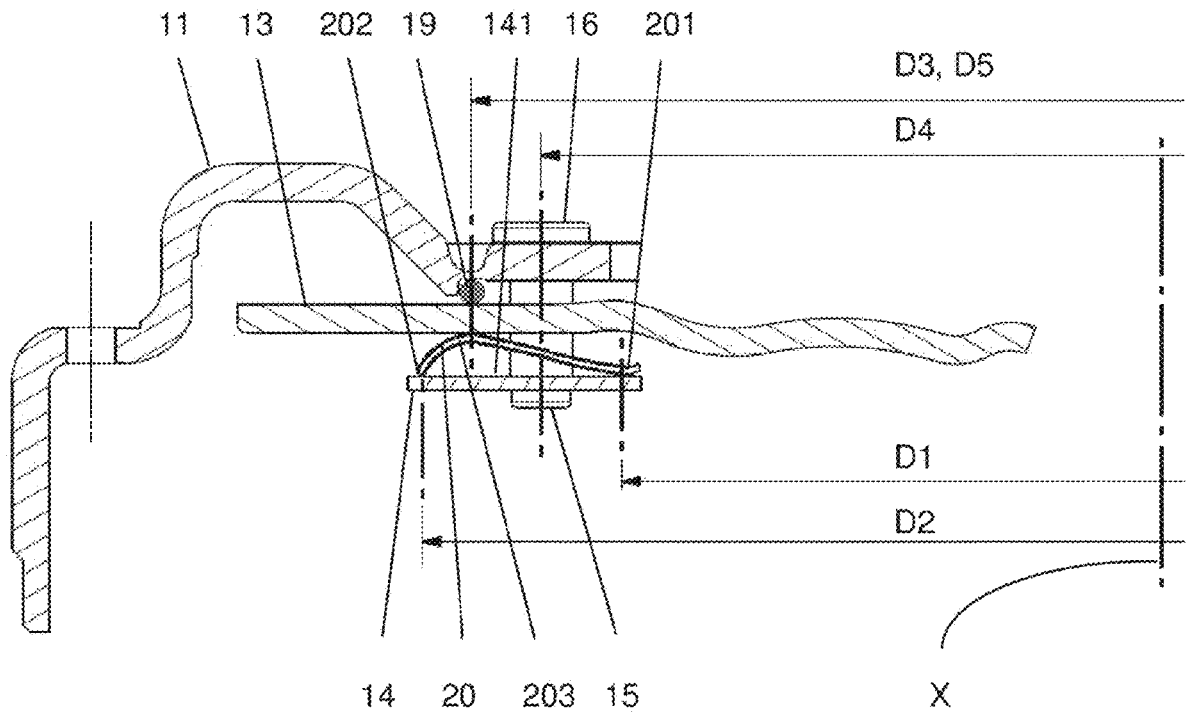
FIG. 8 is a view in axial section of a clutch mechanism according to a fourth embodiment of the invention.

A clutch mechanism 10 according to a fourth embodiment of the invention, in which the third force-application diameter D3 for the reaction force is arranged radially between the first and second force-application diameters D1, D2, will now be described with reference to FIG. 8. Offsetting the third force-application diameter for the reaction force has the effect of reducing the stiffness of the elastic segments and of increasing the capability to compensate for the wearing of the articulation of the diaphragm spring.

In this example, each elastic segment 20, arranged between the support washer 14 and the diaphragm spring 13, comprises a pressing diameter D5, for pressing on the diaphragm spring 13, that coincides with the third force-application diameter D3. Advantageously, the first action force over a first force-application diameter D1 and the second action force over a second force-application diameter D2 are oriented axially in the same direction. Thus, the support washer 14 comprises an upper pressure face 141 oriented toward the diaphragm spring 13, each elastic segment 20 pressing simultaneously on the upper pressure face 141 with the first and second action forces.

Each elastic segment 20 comprises a first application surface 201 for the first action force, a second application surface 202 for the second action force, a third application surface 203 for the reaction force, the third application surface 203 being offset axially with respect to the first and second application surfaces 201, 202. The first application surface 201 is arranged on the first force-application diameter D1, the second application surface 202 is arranged on the second force-application diameter D2, and the third application surface 203 is arranged on the third force-application diameter D3. Axially offsetting the application surfaces for the action and reaction forces has the effect of reducing the stiffness of the elastic segments.

In this fourth embodiment of the invention, each elastic segment 20 comprises through-holes 21 for the axial protuberances 15, the through-holes 21 being arranged radially beyond the first force-application diameter D1 for the first action force. More specifically, the axial protuberances 15 are spacers crimped onto the support washer. The axial stop 16 corresponds to an enlarged head of a spacer which rests on an upper pressure face of the cover. The through-holes 21 for the crimped spacers 15 are arranged radially between the first force-application diameter D1 and the second force-application diameter D2.

In this embodiment, the diaphragm spring 13 is mounted in such a way as to be able to tilt relative to the cover 11 about articulation means produced here in part in the form of an annulus 19 added to the cover. The added annulus 19 is, for example, an open or closed annulus.

Figure 9:
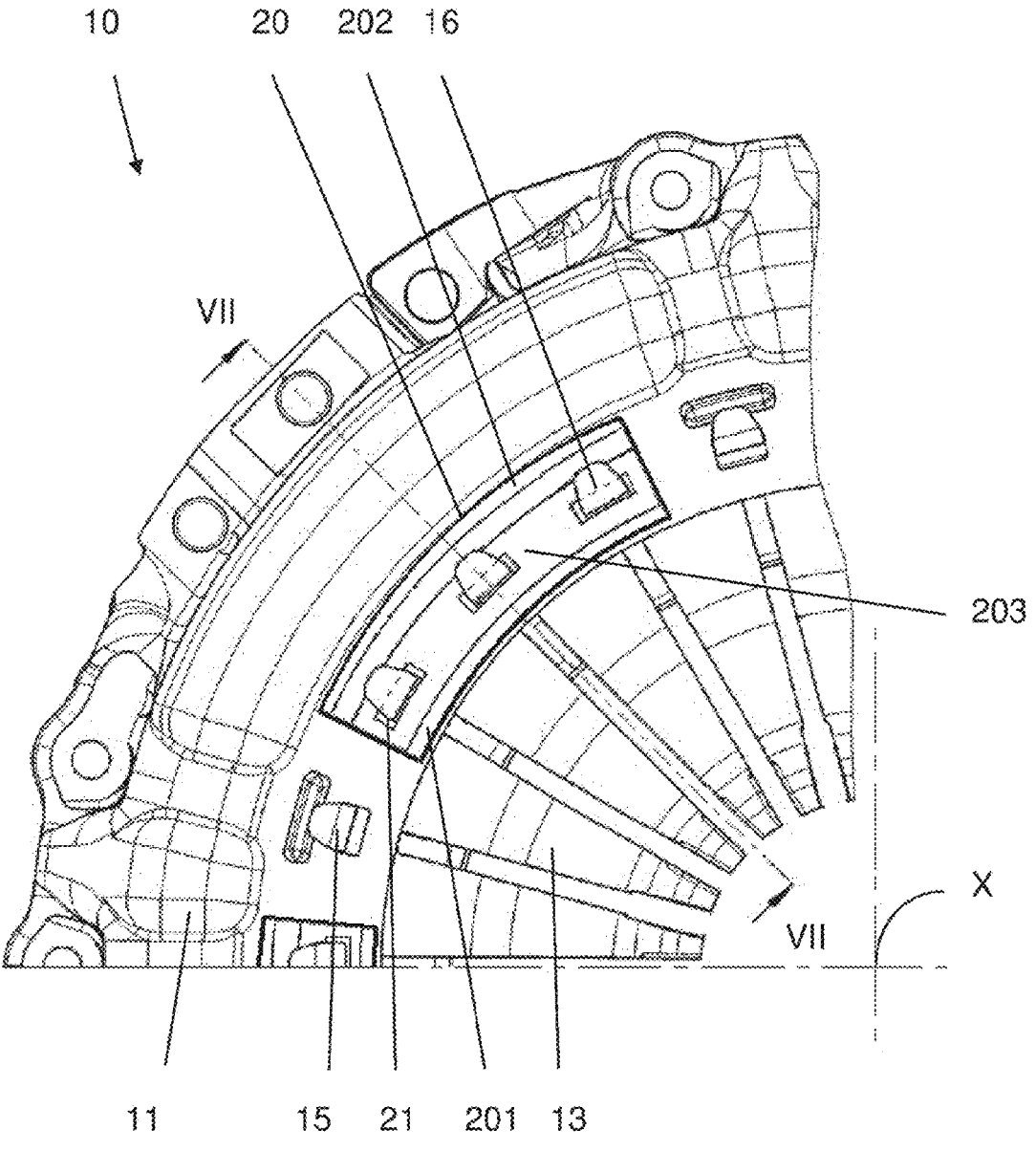
FIG. 9 is a face-on view of a clutch mechanism according to a fifth embodiment of the invention.
Figure 10:
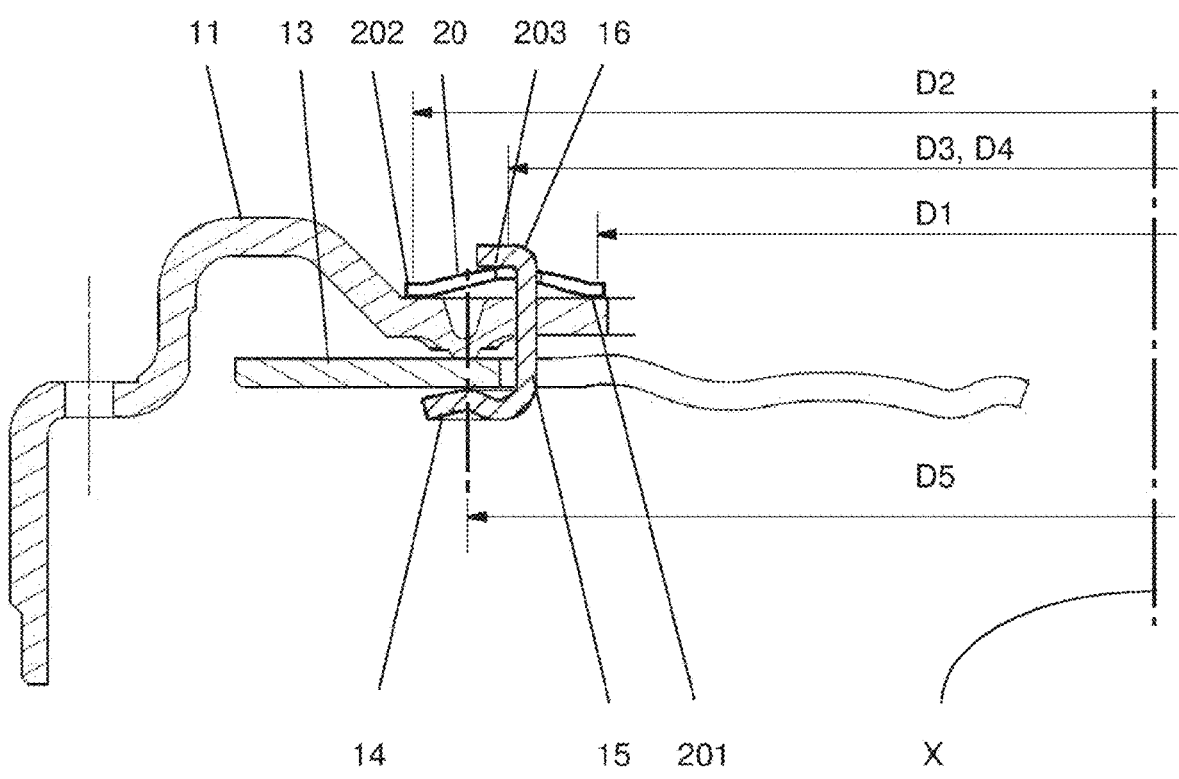
FIG. 10 is a view in axial section of the clutch mechanism according to the fifth embodiment of the invention in FIG. 9.

The invention is not limited to the exemplary embodiments of the invention that have just been described. FIGS. 9 and 10 illustrate a fifth embodiment of the invention in which the elastic segments 20 are arranged between the end of the axial protuberances 15 and the cover 11. In other words, the elastic segments 20 are arranged on the outside of the cover, unlike in the embodiments previously described.

Within this clutch mechanism 10, the diaphragm spring 13 is held in axial preload against the cover 11 by means of a support washer 14 provided with axial protuberances 15 passing through the diaphragm spring and the cover, each axial protuberance 15 having an axial stop 16 able to transmit the axial preload force to the cover, and a plurality of elastic segments 20, distributed angularly about the axis of rotation X of the clutch mechanism, these segments being arranged between two adjacent components of the clutch mechanism, namely between the axial stop 16 of the axial protuberances 15 and the cover 11.

The support washer 14 therefore presses directly against the diaphragm spring 13 on a pressing diameter D5.

As illustrated in FIG. 9, the clutch mechanism 10 by way of example comprises six elastic segments 20, which each extend angularly about the axis X by an angle of around 40°.

Each elastic segment 20 exerts a first action force over a first force-application diameter D1 and a second action force over a second force-application diameter D2 on one of the adjacent components of the clutch mechanism, in this example the support washer 14, as well as a reaction force over a third force-application diameter D3 on the other adjacent component of the clutch mechanism, in this example the diaphragm spring 13. As illustrated in FIG. 10, the first, second and third force-application diameters D1, D2 and D3 are concentric and radially spaced. Offsetting the force-application diameters has the effect of reducing the stiffness of the elastic segments.

In this example, each elastic segment 20 comprises a first application surface 201 for the first action force, a second application surface 202 for the second action force, a third application surface 203 for the reaction force, the third application surface 203 being offset axially with respect to the first and second application surfaces 201, 202. The first application surface 201 is arranged on the first force-application diameter D1, the second application surface 202 is arranged on the second force-application diameter D2, and the third application surface 203 is arranged on the third force-application diameter D3. Axially offsetting the application surfaces for the action and reaction forces has the effect of reducing the stiffness of the elastic segments.

The support washer 14 is produced in the form of a rigid annular component. The support washer 14 is fixed to the cover 11 via the axial protuberances 15, each axial protuberance 15 having an axial stop 16 able to transmit the axial preload force to the cover. In this example, the axial protuberances 15 originate from the support washer, being made as one therewith. More specifically, the axial protuberances 15 are bent tabs originating out of the internal periphery of the support washer 14. The bent-over end of the tab 15 constitutes the axial stop 16. Thus, each elastic segment 20 has a pressing diameter D4, for pressing against the axial stops 16, that coincides with the third force-application diameter D3.

The elastic segments 20 comprise through-holes 21 for the axial protuberances 15, the through-holes 21 being arranged radially beyond the first force-application diameter D1 for the first action force. The through-holes 21 for the tabs 15 are arranged radially between the first force-application diameter D1 and the second force-application diameter D2.

In this fifth embodiment of the invention, the cover 11 comprises an upper pressure face oriented axially toward the outside of the clutch mechanism, each elastic segment 20 pressing simultaneously on the upper pressure face with the first and second action forces. In order to keep the diaphragm spring 13 in axial preload against the cover 11, the reaction force over the third force-application diameter D3 needs to be greater than the axial thrust force F exerted by the clutch bearing 8.

According to another embodiment of the invention in which the diaphragm spring 13 is held in axial preload against the cover 11 by means of a support washer 14, and in which a plurality of elastic segments 20 is arranged between two adjacent components of the clutch mechanism, namely the axial stop 16 of the axial protuberances 15 and the cover 11, the third force-application diameter D3 for the reaction force may be arranged radially to the inside of the first and second force-application diameters D1, D2.

In this other embodiment, each elastic segment may be fixed solidly to the cover using at least one fixing point, for example using riveting, welding or screw fastening. Likewise, the cover may comprise centering studs associated with each elastic segment, the centering studs being extruded from the end wall of the cover.

The invention is not limited to use in an industrial vehicle transmission as described above. The clutch mechanism 10 may also be integrated into a transmission of a so-called "hybrid" motorized vehicle comprising a rotary electric machine able to be coupled to the transmission of power coming from the combustion engine.

The invention claimed is:

1. A clutch mechanism for a motorized vehicle, comprising a cover, a pressure plate coupled in rotation with the cover and movable axially relative thereto, and a diaphragm spring bearing against the cover and the pressure plate, the diaphragm spring being held in axial preload against the cover by a support washer provided with axial protuberances passing through the diaphragm spring and the cover, each axial protuberance having an axial stop able to transmit an axial preload force to the cover, and a plurality of elastic segments, distributed angularly about the axis of rotation of the clutch mechanism, these segments being arranged between two adjacent components of the clutch mechanism, namely between the axial stop of the axial protuberances and the cover or between the support washer and the diaphragm spring, which elastic segments exert the axial preload on the diaphragm spring, wherein each elastic segment exerts a first action force over a first force-application diameter and a second action force over a second force-application diameter on one of the adjacent components of the clutch mechanism, as well as a reaction force over a third force-application diameter on the other adjacent component of the clutch mechanism, the first, second and third force-application diameters being concentric and radially spaced.

2. The clutch mechanism as claimed in claim 1, wherein at least one of the first and second action forces is oriented axially in an opposite direction to the reaction force.

3. The clutch mechanism as claimed in claim 2, wherein each elastic segment comprises a first application surface for the first action force, a second application surface for the second action force, a third application surface for the reaction force, the third application surface being offset axially with respect to the first and second application surfaces.

4. The clutch mechanism as claimed in claim 2, wherein the force-application diameter for at least one of the first and second action forces or the reaction force is offset radially with respect to a radial position at which the axial protuberances pass through the diaphragm spring and the cover.

5. The clutch mechanism as claimed in claim 2, wherein each elastic segment comprises through-holes for the axial protuberances, the through-holes being arranged radially beyond the first force-application diameter for the first action force.

6. The clutch mechanism as claimed in claim 1, wherein each elastic segment comprises a first application surface for the first action force, a second application surface for the second action force, a third application surface for the reaction force, the third application surface being offset axially with respect to the first and second application surfaces.

7. The clutch mechanism as claimed in claim 1, wherein the force-application diameter for at least one of the first and second action forces or the reaction force is offset radially with respect to a radial position at which the axial protuberances pass through the diaphragm spring and the cover.

8. The clutch mechanism as claimed in claim 1, wherein each elastic segment comprises through-holes for the axial protuberances, the through-holes being arranged radially beyond the first force-application diameter for the first action force.

9. The clutch mechanism as claimed in claim 1, wherein the third force-application diameter for the reaction force is arranged radially beyond the first and second force-application diameters.

10. The clutch mechanism as claimed claim 9, wherein the first action force over a first force-application diameter and the second action force over a second force-application diameter are oriented axially in opposite directions.

11. The clutch mechanism as claimed in claim 9, wherein each elastic segment, arranged between the support washer and the diaphragm spring, comprises a pressing diameter for pressing on the diaphragm spring that coincides with the third force-application diameter.

12. The clutch mechanism as claimed in claim 9, wherein each elastic segment comprises tabs originating from an internal circumferential edge, and the support washer comprises orifices distributed angularly about the axis, the tabs of the elastic segments being inserted in the orifices.

13. The clutch mechanism as claimed in claim 12, wherein the support washer comprises an upper pressure face oriented toward the diaphragm spring and a lower pressure face, axially opposite to the upper pressure face, each elastic segment pressing simultaneously on the lower pressure face with the first action force, and on the upper pressure face with the second action force.

14. The clutch mechanism as claimed in claim 13, wherein each elastic segment presses on an internal periphery of the support washer via each tab which is formed at an angle ($\Delta$) with respect to the lower pressing pressure face of the support washer.

15. The clutch mechanism as claimed in claim 9, wherein each elastic segment is fixed solidly to the support washer using at least fixing point comprising a rivet, a weld or a screw.

16. The clutch mechanism as claimed in claim 15, wherein the fixing points for the elastic segments are angularly distributed over the first force-application diameter.

17. The clutch mechanism as claimed in claim 1, wherein the third force-application diameter for the reaction force is arranged radially between the first and second force-application diameters.

18. The clutch mechanism as claimed in claim 17, wherein the first action force over a first force-application diameter and the second action force over a second force-application diameter are oriented axially in the same direction.

19. The clutch mechanism as claimed in claim 17, wherein through-holes for the axial protuberances are arranged radially between the first force-application diameter and the second force-application diameter.

20. The clutch mechanism as claimed in claim 17, wherein each elastic segment, arranged between the axial stop of the axial protuberances and the cover, comprises a pressing diameter for pressing on the axial stops that coincides with the third force-application diameter.

* * * * *